(12) United States Patent
Tanzi

(10) Patent No.: US 12,738,262 B2
(45) Date of Patent: Sep. 15, 2026

(54) ENABLING TRAINING OF A MACHINE-LEARNING MODEL FOR TRIGGER-WORD DETECTION

(71) Applicant: ASSA ABLOY AB, Stockholm (SE)

(72) Inventor: Tanzia Haque Tanzi, Huddinge (SE)

(73) Assignee: ASSA ABLOY AB, Stockholm (SE)

( * ) Notice: Subject to any disclaimer, the term of this patent is extended or adjusted under 35 U.S.C. 154(b) by 559 days.

(21) Appl. No.: 18/253,673

(22) PCT Filed: Nov. 22, 2021

(86) PCT No.: PCT/EP2021/082484
§ 371 (c)(1),
(2) Date: May 19, 2023

(87) PCT Pub. No.: WO2022/106682
PCT Pub. Date: May 27, 2022

(65) Prior Publication Data

US 2024/0005909 A1 Jan. 4, 2024

(30) Foreign Application Priority Data

Nov. 23, 2020 (SE) .................................... 2051362-8

(51) Int. Cl.
*G10L 15/06* (2013.01)
*G10L 15/08* (2006.01)
(Continued)

(52) U.S. Cl.
CPC ............ *G10L 15/063* (2013.01); *G10L 15/08* (2013.01); *G10L 15/1815* (2013.01); *G10L 2015/088* (2013.01); *G10L 15/16* (2013.01)

(58) Field of Classification Search
CPC . G10L 15/063; G10L 15/08; G10L 2015/088; G10L 15/16; G10L 15/1815
(Continued)

(56) References Cited

U.S. PATENT DOCUMENTS 8,700,392 B1 * 4/2014 Hart ........................ G10L 15/25
704/231
10,304,475 B1 * 5/2019 Wang ........................ G01S 3/80
(Continued)

FOREIGN PATENT DOCUMENTS

CN 107918633 4/2018
CN 108320733 A * 7/2018 ............ G10L 25/93
(Continued)

OTHER PUBLICATIONS

Kepuska, et al. "Wake-up-word speech recognition application for first responder communication enhancement." Sensors, and Command, Control, Communications, and Intelligence (C3I) Technologies for Homeland Security and Homeland Defense V. vol. 6201. SPIE, 2006, pp. 431-438. (Year: 2006).*
(Continued)

*Primary Examiner* — James S Wozniak

(74) *Attorney, Agent, or Firm* — Schwegman Lundberg & Woessner, P.A.

(57) ABSTRACT

It is provided a method for enabling training a machine-learning, ML, model for trigger-word detection, the method being performed in a training data provider (1). The method comprises: receiving (40) sound-based data, the sound-based data being based on sounds captured in a space to be monitored; determining (42) that the sound-based data corresponds to a trigger word, and labelling this sound-based data to correspond to the trigger word; and providing (44) the labelled sound-based data to train the ML model.

15 Claims, 3 Drawing Sheets

(51) Int. Cl.
*G10L 15/16* (2006.01)
*G10L 15/18* (2013.01)

(58) Field of Classification Search
USPC .......................................... 704/243–244, 251
See application file for complete search history.

(56) References Cited

U.S. PATENT DOCUMENTS

| | | | | |
|---|---|---|---|---|
| 10,388,272 | B1 * | 8/2019 | Thomson | G10L 15/22 |
| 10,468,026 | B1 * | 11/2019 | Newman | G10L 15/26 |
| 11,322,138 | B2 * | 5/2022 | Li | G06N 3/084 |
| 11,355,102 | B1 * | 6/2022 | Mishchenko | G06F 3/167 |
| 11,615,784 | B2 * | 3/2023 | Gao | G10L 15/08 704/251 |
| 11,669,687 | B1 * | 6/2023 | Joshi | G06F 40/30 704/9 |
| 2014/0207457 | A1 * | 7/2014 | Biatov | G10L 15/063 704/243 |
| 2016/0189706 | A1 | 6/2016 | Zopf et al. | |
| 2016/0267913 | A1 * | 9/2016 | Kim | G06F 1/3231 |
| 2017/0178625 | A1 * | 6/2017 | Mamou | G10L 15/26 |
| 2018/0096681 | A1 * | 4/2018 | Ni | G10L 15/22 |
| 2019/0051299 | A1 * | 2/2019 | Ossowski | G10L 15/22 |
| 2019/0057688 | A1 | 2/2019 | Black | |
| 2020/0143802 | A1 | 5/2020 | Newell | |
| 2020/0349924 | A1 * | 11/2020 | Stoimenov | G10L 15/187 |
| 2021/0158803 | A1 * | 5/2021 | Knudson | G10L 15/22 |
| 2021/0334665 | A1 * | 10/2021 | Wang | G06N 3/045 |
| 2022/0115011 | A1 * | 4/2022 | Sharifi | G10L 15/08 |
| 2022/0165277 | A1 * | 5/2022 | Kracun | G10L 15/197 |
| 2023/0195801 | A1 * | 6/2023 | Yang | G06F 16/31 707/722 |
| 2024/0005926 | A1 * | 1/2024 | Wood | G06F 3/167 |

FOREIGN PATENT DOCUMENTS

| | | |
|---|---|---|
| CN | 110706695 | 1/2020 |
| WO | 2019097276 | 5/2019 |

OTHER PUBLICATIONS

“Swedish Application Serial No. 20513262-8, Search Report mailed Jun. 17, 2021”, 7 pgs.

“International Application Serial No. PCT EP2021 082484, International Search Report mailed Mar. 1, 2022”, 6 pgs.

“Serial No. PCT EP2021 082484, Written Opinion mailed Mar. 1, 2022”, 9 pgs.

“Swedish Application Serial No. 20513262-8, Office Action mailed Oct. 7, 2022”, 4 pgs.

Chung, Yu-An, “Speech2Vec: A Sequence-to-Sequence Framework for Learning Word Embeddings from Speech”, arxiv.org, Cornell University Library, 201OLIN Library Cornell University Ithaca, NY14853, (2018), 5 pgs.

* cited by examiner

ENABLING TRAINING OF A MACHINE-LEARNING MODEL FOR TRIGGER-WORD DETECTION

CROSS-REFERENCE TO RELATED APPLICATION(S)

This application is a national stage application under 35 U.S.C. § 371 of PCT Appl. No. PCT/EP2021/082484, titled "Enabling Training of a Machine-Learning Model for Trigger-Word Detection," filed Nov. 22, 2021, which claims priority to Swedish Patent Appl. No. 2051362-8, filed Nov. 23, 2020, each of which is incorporated herein by reference in its entirety.

TECHNICAL FIELD

The present disclosure relates to the field of trigger-word detection and in particular to enabling training of a machine-learning model for trigger-word detection.

BACKGROUND

New technology opens up new opportunities. For instance, the evolution of electronic devices, it is now possible to monitor people using various sensors. This can be particularly useful for elderly people or disabled people, who in this way can enjoy greatly improved quality of life by living in their own home instead of being in a staffed care facility.

According to some such monitoring devices, the monitored person is able to trigger help when needed using their voice. This can be achieved by defining trigger words that the monitored person can say for this purpose. An audio sensor captures a sound signal and detects if someone utters the trigger word, e.g. 'help'.

The detection of the trigger word can be based on a machine-learning (ML) model. The ML model needs to be trained, ideally also over time after deployment, to improve the performance of the trigger-word detection. However, providing the training data is a tedious and time-consuming process.

SUMMARY

One object is to improve how machine learning models for trigger-word detection can be trained.

According to a first aspect, it is provided a method for enabling training a machine-learning, ML, model for trigger-word detection. The method is performed in a training data provider. The method comprises: receiving sound-based data, the sound-based data being based on sounds captured in a space to be monitored; determining that the sound-based data corresponds to a trigger word, and labelling this sound-based data to correspond to the trigger word; and providing the labelled sound-based data to train the ML model. The determining that the sound-based data corresponds to a trigger word comprises: performing speech recognition of the sound-based data, finding a section of sound-based data that, using the speech recognition, fails to be considered to be a trigger word, but is close to being considered to be a trigger word; obtaining semantic vector data based on the found section of sound-based data; and determining that the found section of sound-based data corresponds to a trigger word when a distance, in vector space, between the semantic vector of the sound-based data and a vector corresponding to the trigger word, is less than a threshold distance.

The sound-based data may be in the form of mel-frequency cepstral coefficients, MFCCs.

The method may further comprise: discarding sections of the sound-based data that fail to correspond to voice sounds.

The method may further comprise, after the providing the labelled sound-based data: discarding all of the sound-based data.

The method may further comprise: training a local ML model; and transmitting at least part of the local ML model to a central location for aggregated learning of a central ML model.

The method may further comprise: receiving an updated ML model being based on the central ML model.

According to a second aspect, it is provided a training data provider for enabling training a machine-learning, ML, model for trigger-word detection. The training data provider comprises: a processor; and a memory storing instructions that, when executed by the processor, cause the training data provider to: receive sound-based data, the sound-based data being based on sounds captured in a space to be monitored; determine that the sound-based data corresponds to a trigger word, and labelling this sound-based data to correspond to the trigger word; and provide the labelled sound-based data to train the ML model. The instructions to determine that the sound-based data corresponds to a trigger word comprise instructions that, when executed by the processor, cause the training data provider to: perform speech recognition of the sound-based data; find a section of sound-based data that, using the speech recognition, fails to be considered to be a trigger word, but is close to being considered to be a trigger word; obtain semantic vector data based on the found section of sound-based data; and determine that the found section of sound-based data corresponds to a trigger word when a distance, in vector space, between the semantic vector of the sound-based data and a vector corresponding to the trigger word, is less than a threshold distance.

The sound-based data may be in the form of mel-frequency cepstral coefficients, MFCCs.

The training data provider may further comprise instructions that, when executed by the processor, cause the training data provider to: discard sections of the sound-based data that fail to correspond to voice sounds.

The training data provider may further comprise instructions that, when executed by the processor, cause the training data provider to, after the instructions to provide the labelled sound-based data, discard all of the sound-based data.

The training data provider may further comprise instructions that, when executed by the processor, cause the training data provider to: train a local ML model; and transmit at least part of the local ML model to a central location for aggregated learning of a central ML model.

The training data provider may further comprise instructions that, when executed by the processor, cause the training data provider to: receive an updated ML model being based on the central ML model.

According to a third aspect, it is provided a computer program for enabling training a machine-learning, ML, model for trigger-word detection. The computer program comprises computer program code which, when executed on a training data provider causes the training data provider to: receive sound-based data, the sound-based data being based on sounds captured in a space to be monitored; determine that the sound-based data corresponds to a trigger word, and labelling this sound-based data to correspond to the trigger word; and provide the labelled sound-based data to train the ML model. The instructions to determine that the sound-based data corresponds to a trigger word comprise instructions that, when executed by the processor, cause the training data provider to: perform speech recognition of the sound-based data; find a section of sound-based data that, using the speech recognition, fails to be considered to be a trigger word, but is close to being considered to be a trigger word; obtain semantic vector data based on the found section of sound-based data; and determine that the found section of sound-based data corresponds to a trigger word when a distance, in vector space, between the semantic vector of the sound-based data and a vector corresponding to the trigger word, is less than a threshold distance.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
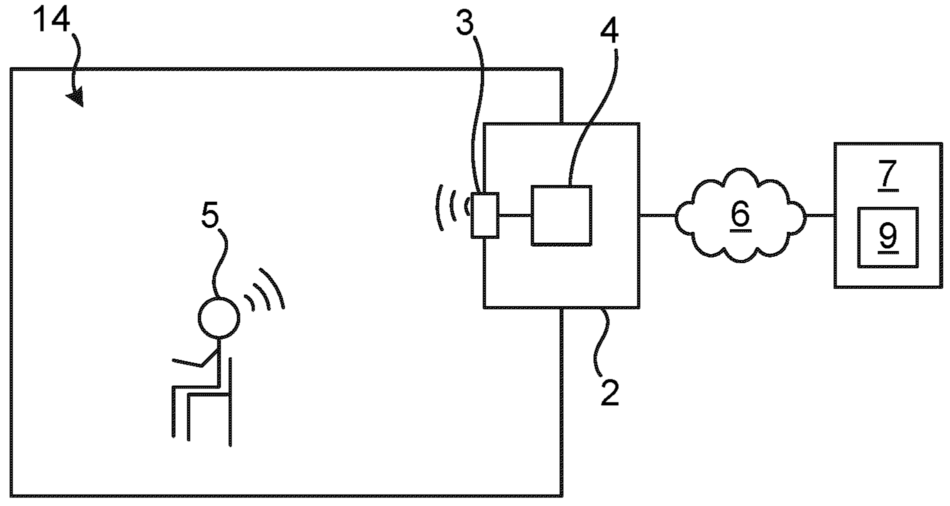
FIG. 1 is a schematic diagram illustrating an environment in which embodiments presented herein can be applied.

FIG. 1 is a schematic diagram illustrating an environment in which embodiments presented herein can be applied. A person 5 to be monitored is at least part of the time present in a physical space 14. The physical space 14 can e.g. be a room, a flat, a house, an office etc. A monitoring device 2 is configured to monitor the person based on an audio sensor 3, such as a microphone. The monitoring device 2 contains a local ML model 4. There may be one or more monitoring devices 2 working in parallel on the same or complementing scene.

The monitoring device 2 can be connected to a network 6, which can be an Internet protocol (IP) based network. The network can e.g. comprise any one or more of a local wireless network, a cellular network, a wired local area network, a wide area network (such as the Internet), etc. Optionally, a central ML device 7, containing a central ML model 9, is also connected to the network 6. The central ML device 7 can then be used in cooperation with a plurality of separate monitoring devices 2 with respective local ML models 4, e.g. as part of a federated ML model.

The monitoring device 2 and/or the central ML device 7 infers results based on input data. Specifically, the monitoring device 2 and/or the central ML device 7 infers when the monitored person 5 utters a trigger word, such as 'help' based on audio data captured by the audio sensor 3. The ML models can support a single trigger word or multiple trigger words.

As described in more detail below, the local ML model 4 and/or the central ML model are trained without manual input based on captured sound data, provided by a training data provider.

There may be one or more monitoring devices 2 to cover a smaller or larger physical space 14. While the training described in embodiments based herein is based on sound data, the monitoring device 2 can also contain other sensors, such as any one or more of video, radar, infrared sensor, etc.

Figures 2A, 2B, 2C:
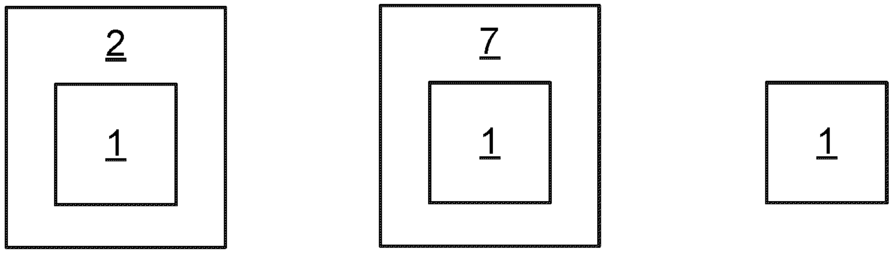
FIGS. 2A-C are schematic diagrams illustrating embodiments of where the training data provider can be implemented.

FIGS. 2A-C are schematic diagrams illustrating embodiments of where the training data provider 1 can be implemented.

In FIG. 2A, the training data provider 1 shown, implemented in the monitoring device 2. The monitoring device 2 is thus the host device for the training data provider 1 in this implementation. In this case, the training data is thus obtained locally, at the site of the local ML model 4.

In FIG. 2B, the training data provider 1 shown, implemented in the central ML device 7. The central ML device 7 is thus the host device for the training data provider 1 in this implementation. In this case, the training data is thus obtained centrally, at the site of the central ML model 9.

In FIG. 2C, the training data provider 1 is shown, implemented as a stand-alone device. The training data provider 1 thus does not have a host device in this implementation. The training data provider 1 can then be located in any suitable location, as long as it can communicate with an ML model for training and with the monitoring device 2 for obtaining sound-based data.

Figure 3A:
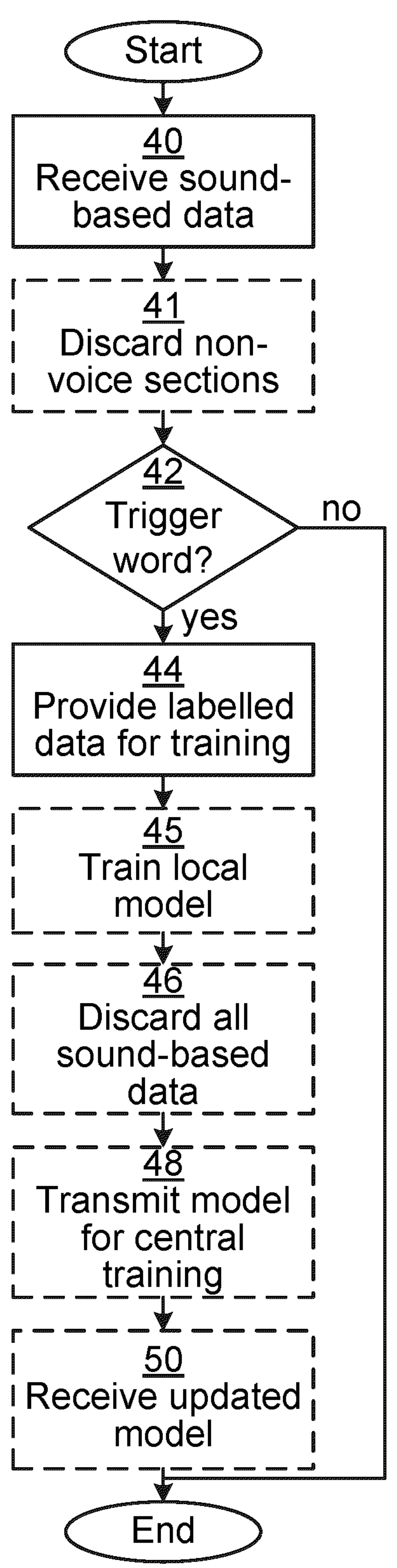
FIGS. 3A-B are flow charts illustrating embodiments of methods for enabling training an ML model for trigger-word detection, by providing training data for the ML model.
Figure 3B:
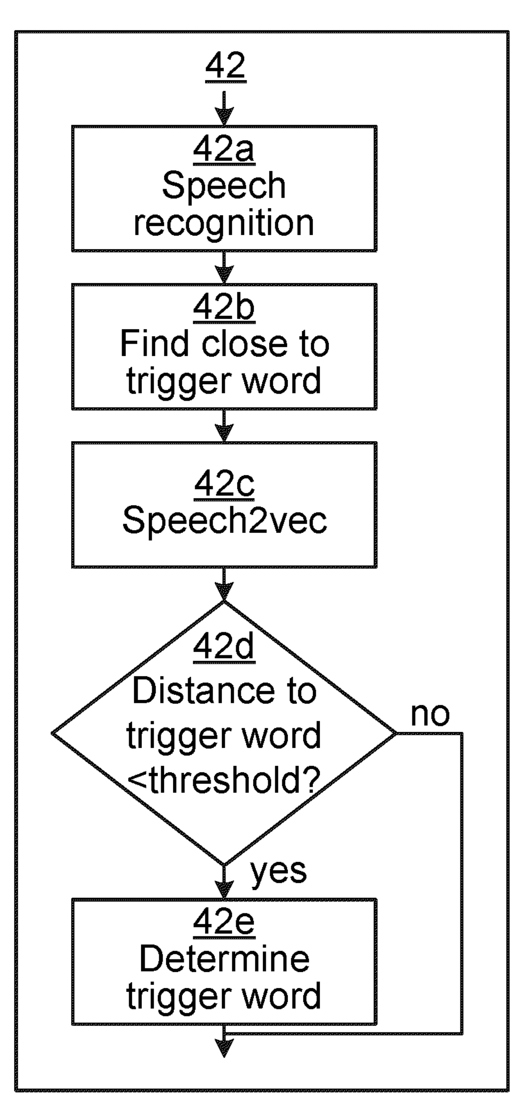

FIGS. 3A-B are flow charts illustrating embodiments of methods for enabling training an ML model for trigger-word detection, by providing training data for the ML model. The method can be performed regularly, e.g. once every 24 hours or on any other suitable schedule, being based on sound-based data collected during that period. In other words, the method can be performed on batch data and is not directly part of the execution of the ML model to infer a result.

While these embodiments are described with reference to one trigger word, the same processing can occur for multiple trigger words.

In a receive sound-based data step 40, the training data provider 1 receives sound-based data, the sound-based data being based on sounds captured in a space to be monitored. The sound-based data can be in the form of mel-frequency cepstral coefficients, MFCCs. MFCCs are an efficient way to represent sound data audible by humans.

In an optional discard non-voice sections step 41, the training data provider 1 discards sections of the sound-based data that fail to correspond to voice sounds. Since the training is used to recognise a trigger word uttered by a user, the sections (in time) that do not contain voice data can safely be discarded, thus saving storage and processing requirements, as well as bandwidth when the sound-based data is communicated.

In a conditional trigger word step 42, the training data provider 1 determines when the sound-based data corresponds to a trigger word. This step can be performed repeatedly for a plurality of (time) sections of the sound-based data. When a trigger word is determined, the training data provider labels this (section of) sound-based data to correspond to the trigger word and the method proceeds to a provide labelled data for training step 44. Otherwise, the method ends. The labelling thus indicates that the sound-based data corresponds to a trigger word. In one embodiment, the trigger word is not determined using an ML model, since it is the ML model that is to be trained. Training an ML model based on its own inference would not result in any improvement of the ML model.

In a provide labelled data for training step 44, the training data provider 1 provides the labelled sound-based data to train the ML model. Since the data is labelled, the labelled sound-based data can be used by the ML model to improve its performance. The ML model can be the local ML model 4 and/or the central ML model 9. When the labelled sound-based data needs to be transmitted, e.g. from the monitoring device 2 to the central ML device 7, the labelled sound-based data can be encrypted to preserve privacy during the data transfer.

In an optional train local model step 45 the training data provider trains the local ML model 4.

In an optional discard all sound-based data step 46, the training data provider 1 discards all of the sound-based data. In this way, when the processing is done, no privacy sensitive sound-based data is stored.

In an optional transmit model for central training step 48, the training data provider 1 transmits at least part of the local ML model 4 to a central location for aggregated learning of a central ML model.

In an optional receive updated model step 50 the training data provider receives an updated ML model being based on the central ML model.

When steps 45, 48 and 50 are performed, these form part of a federated learning process, where the central ML model can be based on multiple local ML models, and where the resulting aggregated central ML model is used for the local ML models. Such a solution is particularly applicable for a situation based on events that only occur rarely, such as trigger-word detection. By aggregating the local ML models in the central ML model, which is pushed back to the local level, the training is based on multiple local ML models which thus increases the number of instances of trigger-word detection.

Looking now to FIG. 3B, this is a flow chart illustrating sub-steps of the conditional trigger word step 42.

In a speech recognition sub-step, 42*a*, the training data provider 1 performs speech recognition of the sound-based data.

In a find close to trigger word sub-step 42*b*, the training data provider 1 finds a section of sound-based data that, using the speech recognition, fails to be considered to be a trigger word, but is close to being considered to be a trigger word. Close can here be determined by a metric of speech-recognition similarity between the sound-based data and the trigger word being higher than a threshold, but lower than a threshold to consider the sound-based data to correspond to the trigger word.

In a speech2vec sub-step 42*c*, the training data provider 1 obtains semantic vector data based on the found section of sound-based data. The section of sound-based data is then used to get a vector. The vector is a sequence of numbers, in the format of (a, b, c, . . . ), where a, b, c, etc. are real numbers. The size of the vector is also called the number of dimensions of the vector. This step can e.g. be performed using its own ML model, using a speech2vec framework. Speech2vec is similar to word2vec, which vectorises words in text format, but speech2vec is based on vectorisation of sound-based data, i.e. not text data.

In a conditional distance to trigger word<threshold sub-step 42*d*, the training data provider 1 determines when the found section of sound-based data corresponds to a trigger word. This is determined when a distance, in vector space, between the semantic vector of the sound-based data and a vector corresponding to the trigger word, is less than a threshold distance. When this is the case, the method proceeds to the determine trigger word sub-step 42*e*. Otherwise, there is no trigger word determined in the conditional trigger word step 42. The distance can e.g. be a Euclidian distance or a cosine distance between the vectors.

In a determine trigger word step 42*e*, the training data provider 1 determines the trigger word to correspond to the found section. This step is performed when step 42*d* is positive. In other words, the speech recognition in step 42*b* considers the section of sound-based data to be close to trigger word, but not sufficiently close to be a match. When this close (speech recognition) match is combined with the vector analysis of the section of sound-based data, voice utterances which are not sufficient to trigger a speech recognition match are still found to correspond to the trigger word based on the vector comparison. This allows variations of the trigger word to be detected as the trigger word, which can thus be used for the training of the ML model(s).

This solution can be exploited in a semi-automated training, where a person utters the trigger word in deliberate variations which can correspond to when the person is in a real state of help, e.g. when lying down or in a weakened state. Such variations of utterances of the trigger word will then be automatically captured in steps 42*a-e* and result in ML model(s) that are more capable of recognising the trigger word when such variations of utterances occur when in operation.

Using embodiments presented herein, training can be performed without manual input, and this training can continue regularly based on real data after deployment. Since more training results in a better ML model, the ML model(s) will improve over time, resulting in better recognition of the trigger word, covering new variants over time. Additionally, by vectorizing the sound data (rather than word data from speech recognition), trigger words can be detected even if the person uttering the trigger word is on the floor or is in an otherwise weakened state where speech recognition fails. The ability to detect trigger words in this situation is of great importance for the context of embodiments presented herein, where trigger words can be used e.g. for elderly care. This solution thus solves a problem of improving the recognition of trigger words, and subsequent training of an ML model, when the monitored person may not be able to clearly say the trigger word.

Figure 4:
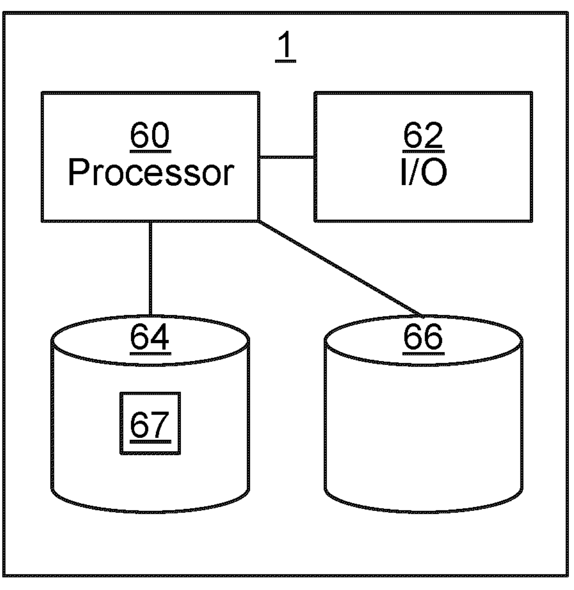
FIG. 4 is a schematic diagram illustrating components of the training data provider of FIGS. 2A-C.

FIG. 4 is a schematic diagram illustrating components of the training data provider 1 of FIGS. 2A-C. It is to be noted that, when the training data provider 1 is implemented in a host device (see FIGS. 2A-B and corresponding text above), one or more of the mentioned components can be shared with the host device. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A-B above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The training data provider 1 further comprises an I/O interface 62 for communicating with external and/or internal entities. For instance, the I/O interface 62 allows the training data provider 1 to communicate the network 6. Optionally, the I/O interface 62 also includes a user interface.

Other components of the training data provider 1 are omitted in order not to obscure the concepts presented herein.

Figure 5:
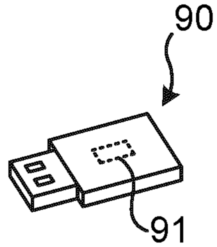
FIG. 5 shows one example of a computer program product comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 4. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

Hereinafter follows a list of embodiments, enumerated with roman numerals.

i. A method for enabling training a machine-learning, ML, model for trigger-word detection, the method being performed in a training data provider, the method comprising:

receiving sound-based data, the sound-based data being based on sounds captured in a space to be monitored;

determining that the sound-based data corresponds to a trigger word, and labelling this sound-based data to correspond to the trigger word; and providing the labelled sound-based data to train the ML model.

ii. The method according to embodiments i, wherein the sound-based data is in the form of mel-frequency cepstral coefficients, MFCCs.

iii. The method according to any one of the preceding embodiments, further comprising:

discarding sections of the sound-based data that fail to correspond to voice sounds.

iv. The method according to any one of the preceding embodiments, wherein the determining that the sound-based data corresponds to a trigger word comprises:

performing speech recognition of the sound-based data.

v. The method according to embodiment iv, wherein the determining that the sound-based data corresponds to a trigger word comprises:

finding a section of sound-based data that, using the speech recognition, fails to be considered to be a trigger word, but is close to being considered to be a trigger word;

obtaining semantic vector data based on the found section of sound-based data; and determining that the found section of sound-based data corresponds to a trigger word when a distance, in vector space, between the semantic vector of the sound-based data and a vector corresponding to the trigger word, is less than a threshold distance.

vi. The method according to any one of the preceding embodiments, further comprising, after the providing the labelled sound-based data:

discarding all of the sound-based data.

vii. The method according to any one of the preceding embodiments, further comprising:

training a local ML model; and transmitting at least part of the local ML model to a central location for aggregated learning of a central ML model.

viii. The method according to embodiment vii, further comprising:

receiving an updated ML model being based on the central ML model.

ix. A training data provider for enabling training a machine-learning, ML, model for trigger-word detection, the training data provider comprising:

a processor; and a memory storing instructions that, when executed by the processor, cause the training data provider to:

receive sound-based data, the sound-based data being based on sounds captured in a space to be monitored;

determine that the sound-based data corresponds to a trigger word, and labelling this sound-based data to correspond to the trigger word; and provide the labelled sound-based data to train the ML model.

x. The training data provider according to embodiment ix, wherein the sound-based data is in the form of mel-frequency cepstral coefficients, MFCCs.

xi. The training data provider according to any one of embodiments ix to x, further comprising instructions that, when executed by the processor, cause the training data provider to:

discard sections of the sound-based data that fail to correspond to voice sounds.

xii. The training data provider according to any one of embodiments ix to xi, wherein the instructions to determine that the sound-based data corresponds to a trigger word comprise instructions that, when executed by the processor, cause the training data provider to:

perform speech recognition of the sound-based data.

xiii. The training data provider according to embodiment xii, wherein the instructions to determine that the sound-based data corresponds to a trigger word comprise instructions that, when executed by the processor, cause the training data provider to:

find a section of sound-based data that, using the speech recognition, fails to be considered to be a trigger word, but is close to being considered to be a trigger word;

obtain semantic vector data based on the found section of sound-based data; and determine that the found section of sound-based data corresponds to a trigger word when a distance, in vector space, between the semantic vector of the sound-based data and a vector corresponding to the trigger word, is less than a threshold distance.

xiv. The training data provider according to any one of embodiments ix to xiii, further comprising instructions that, when executed by the processor, cause the training data provider to, after the instructions to provide the labelled sound-based data, discard all of the sound-based data.

xv. The training data provider according to any one of embodiments ix to xiv, further comprising instructions that, when executed by the processor, cause the training data provider to:

train a local ML model; and transmit at least part of the local ML model to a central location for aggregated learning of a central ML model.

xvi. The training data provider according to embodiment xv, further comprising instructions that, when executed by the processor, cause the training data provider to:

receive an updated ML model being based on the central ML model.

xvii. A computer program for enabling training a machine-learning, ML, model for trigger-word detection, the computer program comprising computer program code which, when executed on a training data provider causes the training data provider to:

receive sound-based data, the sound-based data being based on sounds captured in a space to be monitored;

determine that the sound-based data corresponds to a trigger word, and labelling this sound-based data to correspond to the trigger word; and provide the labelled sound-based data to train the ML model.

xviii. A computer program product comprising a computer program according to embodiment xvii and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for enabling training a machine-learning, ML, model for trigger-word detection, the method being performed in a training data provider, the method comprising:

receiving sound-based data, the sound-based data being based on sounds captured in a space to be monitored;

determining that the sound-based data corresponds to a trigger word, the determining comprising:

performing speech recognition of the sound-based data;

finding a section of sound-based data that, using the speech recognition, fails to be considered to be the trigger word, but is close to being considered to be the trigger word;

obtaining semantic vector data based on the found section of sound-based data; and determining that the found section of sound-based data corresponds to the trigger word when a distance, in vector space, between the semantic vector data of the sound-based data and a vector corresponding to the trigger word, is less than a threshold distance;

labelling the sound-based data, including the found section, to correspond to the trigger word; and providing the labelled sound-based data to train the ML model.

2. The method according to claim 1, wherein the sound-based data is in the form of mel-frequency cepstral coefficients, MFCCs.

3. The method according to claim 1, further comprising:

discarding sections of the sound-based data that fail to correspond to voice sounds.

4. The method according to claim 1, further comprising, after the providing the labelled sound-based data:

discarding all of the sound-based data.

5. The method according to claim 1, further comprising:

training a local ML model; and transmitting at least part of the local ML model to a central location for aggregated learning of a central ML model.

6. The method according to claim 5, further comprising:

receiving an updated ML model being based on the central ML model.

7. The method according to claim 5, wherein the ML model is the local ML model.

8. A training data provider for enabling training a machine-learning, ML, model for trigger-word detection, the training data provider comprising:

a processor; and a memory storing instructions that, when executed by the processor, cause the training data provider to:

receive sound-based data, the sound-based data being based on sounds captured in a space to be monitored;

determine that the sound-based data corresponds to a trigger word, which comprises instructions that, when executed by the processor, cause the training data provider to:

perform speech recognition of the sound-based data;

find a section of sound-based data that, using the speech recognition, fails to be considered to be the trigger word, but is close to being considered to be the trigger word;

obtain semantic vector data based on the found section of sound-based data; and determine that the found section of sound-based data corresponds to the trigger word when a distance, in vector space, between the semantic vector data of the sound-based data and a vector corresponding to the trigger word, is less than a threshold distance;

label the sound-based data, including the found section, to correspond to the trigger word; and provide the labelled sound-based data to train the ML model.

9. The training data provider according to claim 8, wherein the sound-based data is in the form of mel-frequency cepstral coefficients, MFCCs.

10. The training data provider according to claim 8, further comprising instructions that, when executed by the processor, cause the training data provider to:

discard sections of the sound-based data that fail to correspond to voice sounds.

11. The training data provider according to claim 8, further comprising instructions that, when executed by the processor, cause the training data provider to, after the instructions to provide the labelled sound-based data, discard all of the sound-based data.

12. The training data provider according to claim 8, further comprising instructions that, when executed by the processor, cause the training data provider to:

train a local ML model; and transmit at least part of the local ML model to a central location for aggregated learning of a central ML model.

13. The training data provider according to claim 12, further comprising instructions that, when executed by the processor, cause the training data provider to:

receive an updated ML model being based on the central ML model.

14. The training data provider according to claim 12, wherein the ML model is the local ML model.

15. A non-transitory computer readable storage medium storing a computer program for enabling training a machine-learning, ML, model for trigger-word detection, the computer program comprising computer program code which, when executed on a training data provider, causes the training data provider to:

receive sound-based data, the sound-based data being based on sounds captured in a space to be monitored;

determine that the sound-based data corresponds to a trigger word, wherein the computer program code to determine that the sound-based data corresponds to the trigger word comprises instructions that, when executed by the processor, cause the training data provider to:

perform speech recognition of the sound-based data;

find a section of sound-based data that, using the speech recognition, fails to be considered to be the trigger word, but is close to being considered to be the trigger word;

obtain semantic vector data based on the found section of sound-based data; and determine that the found section of sound-based data corresponds to the trigger word when a distance, in vector space, between the semantic vector data of the sound-based data and a vector corresponding to the trigger word, is less than a threshold distance;

label the sound-based data, including the found section, to correspond to the trigger word; and provide the labelled sound-based data to train the ML model.

* * * * *